(12) United States Patent
Hu

(10) Patent No.: US 11,310,071 B2
(45) Date of Patent: Apr. 19, 2022

(54) DORMANCY CONTROLLING METHOD FOR ON BOARD COMPUTING PLATFORM, DEVICE AND READABLE STORAGE MEDIUM

(71) Applicant: BEIJING BAIDU NETCOM SCIENCE TECHNOLOGY CO., LTD., Beijing (CN)

(72) Inventor: Jiayue Hu, Beijing (CN)

(73) Assignee: BEIJING BAIDU NETCOM SCIENCE TECHNOLOGY CO., LTD.

( * ) Notice: Subject to any disclaimer, the term of this patent is extended or adjusted under 35 U.S.C. 154(b) by 0 days.

(21) Appl. No.: 17/337,971

(22) Filed: Jun. 3, 2021

(65) Prior Publication Data

US 2021/0288835 A1    Sep. 16, 2021

(30) Foreign Application Priority Data

Nov. 30, 2020 (CN) .......................... 202011379880.X (51) Int. Cl.
*H04L 12/40* (2006.01)
*G06F 1/3287* (2019.01)
*G07C 9/00* (2020.01)

(52) U.S. Cl.
CPC ............ *H04L 12/40* (2013.01); *G06F 1/3287* (2013.01); *G07C 9/00309* (2013.01); *H04L 2012/40215* (2013.01)

(58) Field of Classification Search
None
See application file for complete search history.

(56) References Cited

U.S. PATENT DOCUMENTS

| | | | | |
|---|---|---|---|---|
| 9,845,632 | B2 * | 12/2017 | Dezorzi | ................... G07C 9/28 |
| 10,373,415 | B2 * | 8/2019 | Atsumi | ................ B60R 25/002 |
| 2004/0054746 | A1 | 3/2004 | Shibata | |
| 2005/0239409 | A1 * | 10/2005 | Oh | ........................ H04W 52/12 |
| | | | | 455/67.11 |
| 2008/0074689 | A1 | 3/2008 | Yamada et al. | |
| 2012/0123639 | A1 | 5/2012 | Ochiai et al. | |

(Continued)

FOREIGN PATENT DOCUMENTS

| CN | 103164877 A | 6/2013 |
|---|---|---|
| CN | 104035395 A | 9/2014 |

(Continued)

OTHER PUBLICATIONS

European Search Report in EP Patent Application No. 21177201.7 dated Nov. 24, 2021.

(Continued)

*Primary Examiner* — Carlos Garcia
(74) *Attorney, Agent, or Firm* — Dilworth IP, LLC (57) ABSTRACT

The present disclosure discloses a dormancy controlling method for an on board computing platform, a device and a readable storage medium, which relate to the field of autonomous driving in computer technology. A specific implementation is: determining a dormancy level corresponding to the on board computing platform; and controlling, according to the dormancy level, operating states of at least one processor and an external device controlled by the at least one processor in the on board computing platform.

14 Claims, 4 Drawing Sheets

(56) References Cited

U.S. PATENT DOCUMENTS

| | | | |
|---|---|---|---|
| 2015/0039877 A1 | 2/2015 | Hall et al. | |
| 2016/0176265 A1* | 6/2016 | Rolka | B60W 40/08 701/45 |
| 2017/0088072 A1 | 3/2017 | Curtis et al. | |
| 2019/0039580 A1* | 2/2019 | Shimizu | B60T 17/22 |

FOREIGN PATENT DOCUMENTS

| | | |
|---|---|---|
| CN | 104477111 A | 4/2015 |
| JP | 2004102334 A | 4/2004 |
| JP | 2008083754 A | 4/2008 |
| JP | 2010102738 A | 5/2010 |
| JP | 2010165206 A | 7/2010 |
| JP | 2015135712 A | 7/2015 |
| JP | 201836940 A | 3/2018 |
| JP | 2019212175 A | 12/2019 |
| JP | 2020506462 A | 2/2020 |

OTHER PUBLICATIONS

First Office Action in JP Patent Application No. 2021-055913 dated Jan. 28, 2022.

* cited by examiner

DORMANCY CONTROLLING METHOD FOR ON BOARD COMPUTING PLATFORM, DEVICE AND READABLE STORAGE MEDIUM

CROSS-REFERENCE TO RELATED APPLICATION

This application claims priority to Chinese Patent Application No. 202011379880.X, filed on Nov. 30, 2020, the disclosure of which is hereby incorporated by reference in its entirety.

TECHNICAL FIELD

The present disclosure relates to autonomous driving in computer technology, and in particular, to a dormancy controlling method for an on board computing platform, a device, and a readable storage medium.

BACKGROUND

With the development of autonomous driving technology, in order to enable autonomous driving vehicles to achieve more functions, on board computing platforms gradually enter public vision. The on board computing platforms can receive data collected by a variety of external sensors, and analyze and calculate the data to provide data support for the autonomous driving vehicles. However, a powerful on board computing platform often requires higher power consumption. How to reduce the power consumption of the on board computing platform has become an urgent problem to be solved.

SUMMARY

The present disclosure provides a dormancy controlling method for an on board computing platform, a device, and a readable storage medium, which are used to solve the technical problem that the existing vehicle control methods cannot achieve the effective adjustment of the power consumption of the on board computing platform with multi-processors and cannot adapt to different scenarios.

According to a first aspect of the present disclosure, a dormancy controlling method for an on board computing platform is provided, including:

determining a dormancy level corresponding to the on board computing platform;

and controlling, according to the dormancy level, operating states of at least one processor and an external device controlled by the at least one processor in the on board computing platform.

According to a second aspect of the present disclosure, a dormancy controlling apparatus for an on board computing platform is provided, including:

a determining module, configured to determine a dormancy level corresponding to the on board computing platform; and a controlling module, configured to control, according to the dormancy level, operating states of at least one processor and an external device controlled by the at least one processor in the on board computing platform.

According to a third aspect of the present disclosure, an electronic device is provided, including:

at least one processor; and a memory communicatively connected to the at least one processor; where, the memory stores instructions executable by the at least one processor, and the instructions are executed by the at least one processor, to enable the at least one processor to execute the method according to the first aspect.

According to a fourth aspect of the present disclosure, a non-transitory computer-readable storage medium storing computer instructions is provided, where the computer instructions are used to cause a computer to execute the method according to the first aspect.

It should be understood that the content described in this section is not intended to identify the key or important features of the embodiments of the present disclosure, nor is it intended to limit the scope of the present disclosure. Other features of the present disclosure will be easily understood through the following description.

BRIEF DESCRIPTION OF DRAWINGS

The attached drawings are used for a better understanding of the solutions and do not constitute a limitation of the present disclosure. Among them.

DESCRIPTION OF EMBODIMENTS

Exemplary embodiments of the present disclosure will be illustrated in combination with the accompanying drawings in the following, which include various details of the embodiments of the present disclosure to facilitate understanding, and they should be considered as merely exemplary. Therefore, those of ordinary skill in the art should recognize that various changes and modifications can be made to the embodiments described herein without departing from the scope and spirit of the present disclosure. Also, for clarity and conciseness, description of well-known functions and structures are omitted in the following description.

Existing vehicle control methods generally achieve the effect of reducing the power consumption of the vehicle by adjusting an operating state of a main controller in the vehicle.

However, the aforementioned vehicle control methods are only applicable to electronic control units that have simple requirements on dormancy and wakening. For the powerful on board computing platform, it often has multiple different processors, which, correspondingly, implement different functions respectively. The above vehicle control methods cannot achieve effective adjustment of the power consumption of the on board computing platform with multi-processors, and directly switching the operating state of the main controller may cause some functions of the autonomous vehicle to not be implemented normally.

In view of the above-mentioned technical problem that the existing vehicle control methods cannot achieve the effective adjustment of the power consumption of the on board computing platform with multi-processors, and cannot adapt to different scenarios caused due to direct switching of an operating state of a controller area network (CAN) bus, the present disclosure provides a dormancy controlling method for an on board computing platform, a device, and a readable storage medium.

It should be noted that the dormancy controlling method for the on board computing platform, the device, and the readable storage medium provided by the present disclosure may be used in various scenarios of dormancy controlling of the on board computing platform with multi-processors.

With gradual increasing in functions implemented by an on board computing platform, the power consumption required by it also increases. Therefore, how to enable the on board computing platform to reduce the power consumption on the basis of being able to implement the functions has become an urgent problem to be solved. Current vehicle control methods generally directly adjust an operating state of a main controller in a vehicle, to achieve the effect of reducing the power consumption by controlling the main controller to enter a dormancy state. However, using the above methods to perform vehicle control operations often cannot achieve the effective adjustment of the power consumption of the on board computing platform with multi-processors, and cannot adapt to a variety of different application scenarios.

In the process of solving the above technical problem, the inventor found through research that in order to achieve the effective adjustment of the power consumption of the on board computing platform with multi-processors, different processors in the on board computing platform can be controlled to enter an dormancy state according to different application scenarios.

The inventor found through further research that a time interval during which the on board computing platform has not been operated may be determined after the on board computing platform is powered on. A dormancy level corresponding to this time interval is determined according to this time interval, so that operating states of different processors in the on board computing platform can be controlled according to the dormancy level.

The technology of the present disclosure, by determining the dormancy level corresponding to the on board computing platform, can control the operating states of different processors in the on board computing platform according to the dormancy level, which solves the technical problem that the existing vehicle control methods cannot achieve the effective adjustment of the power consumption of the on board computing platform with multi-processors and cannot adapt to different scenarios.

Figure 1:
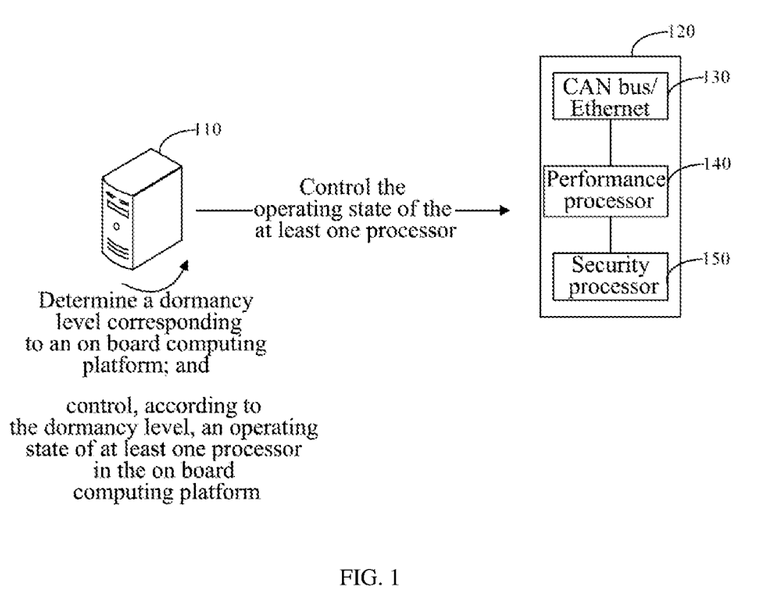
FIG. 1 is a schematic diagram of a system architecture on which the present disclosure is based.

FIG. 1 is a schematic diagram of a system architecture on which the present disclosure is based. As shown in FIG. 1, the system architecture on which the present disclosure is based at least includes: a controller 110 and an on board computing platform 120. The controller 110 is provided with a dormancy control apparatus of the on board computing platform. The on board computing platform 120 is provided with a performance processor 140, a security processor 150, and a CAN bus/Ethernet 130, which are configured to control vehicle to autonomously driving. The controller 110 is communicatively connected to the on board computing platform 120, so that a dormancy level can be determined according to a time interval during which the on board computing platform 120 has not been operated, and operating states of the processors in the on board computing platform 120 can be adjusted according to the dormancy level.

The present disclosure provides a dormancy controlling method for an on board computing platform, a device and a readable storage medium, which are applied to autonomous driving in computer technology to achieve the effect of flexible performing dormancy control according to different application scenarios.

Figure 2:
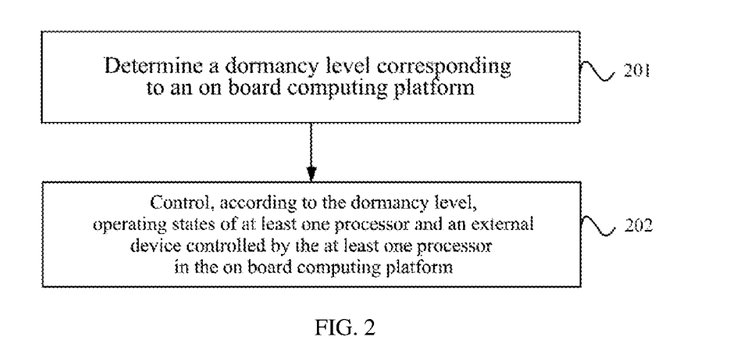
FIG. 2 is a schematic flowchart of a dormancy controlling method for an on board computing platform according to a first embodiment of the present disclosure.

FIG. 2 is a schematic flowchart of a dormancy controlling method for an on board computing platform according to a first embodiment of the present disclosure. As shown in FIG. 2, the method includes:

step 201: determine a dormancy level corresponding to the on board computing platform.

An execution body of this embodiment is a dormancy controlling apparatus for the on board computing platform. The dormancy controlling apparatus for the on board computing platform may be coupled to an on board controller. The on board controller is communicatively connected to the on board computing platform, so as to be able to perform information interaction with the on board computing platform.

In this implementation, at least one processor is provided in the on board computing platform, which is specifically configured to control vehicle to autonomously driving. A driver may choose to use the on board computing platform to realize the autonomous driving according to actual needs, or may perform manual driving without using the on board computing platform.

Since at least one processor is provided in the on board computing platform, the power consumption generated during operation of different numbers of processors is also different. Therefore, in order to enable the on board computing platform to achieve different dormancy levels under different scenarios, so that the power consumption of the on board computing platform is more suitable for actual application scenarios, an operating state of the at least one processor in the on board computing platform may be controlled according to different application scenarios.

Specifically, the dormancy level corresponding to the on board computing platform may be determined first. The operating state of the at least one processor in the on board computing platform under different dormancy levels are different.

Step 202: control, according to the dormancy level, operating states of at least one processor and an external device controlled by the at least one processor in the on board computing platform.

In this implementation, after the dormancy level of the current vehicle is determined, the operating states of the at least one processor and the external device controlled by the at least one processor in the on board computing platform may be adjusted according to the dormancy level.

Specifically, different processors in the on board computing platform are configured to process different data, since functions implemented by them are different, dormancy control operations may be performed on different processors according to different dormancy levels.

Figure 3:
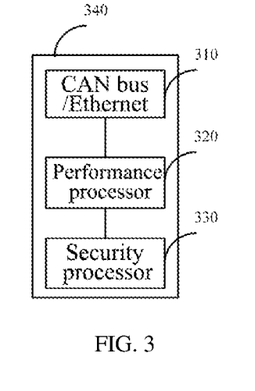
FIG. 3 is a schematic structural diagram of an on board computing platform according to the present disclosure.

FIG. 3 is a schematic structural diagram of an on board computing platform 340 according to the present disclosure. As shown in FIG. 3, the on board computing platform includes a CAN bus/Ethernet 310, a performance processor 320, and a security processor 330. The security processor 330 is communicatively connected to the performance processor 320 and the CAN bus/Ethernet 310, respectively.

Based on the structure of the above-mentioned on board computing platform, the performance processor 320 may be specifically configured to compute a driving path according to data collected by sensors, generate a control instruction according to the current driving path, and send the control instruction to the security processor 330. The security processor 330 is configured to perform check and judgment on this control instruction, and transmit the checked control instruction to other on board controllers in the vehicle through the CAN bus/Ethernet 310 to realize autonomous driving. In order to improve the efficiency of data processing, the number of the performance processor 320 may be at least one, and each performance processor 320 is in communicatively connected to the security processor 330.

That is, the performance processor 320 is used for data collecting and high-performance computing to generate the control instruction, the security processor 330 is used for check and judgment of the control instruction, and the CAN bus/Ethernet 310 is used for data forwarding. Therefore, operating states of the performance processor 320 and the security processor 330 in the on board computing platform may be controlled according to the dormancy level.

In addition, the on board computing platform also includes external devices controlled by the performance processor and the security processor. In order to further achieve the effect of saving the power consumption, operating states of the performance processor, the security processor and the external devices controlled by the performance processor and the security processor in the on board computing platform may also be controlled according to the dormancy levels.

The dormancy controlling method for the on board computing platform provided by this embodiment, by determining the dormancy level corresponding to the on board computing platform, can control the operating states of different processors in the on board computing platform according to the dormancy level, which solves the technical problem that the existing vehicle control methods cannot achieve the effective adjustment of the power consumption of the on board computing platform with multi-processors and cannot adapt to different scenarios.

Further, on the basis of the first embodiment, step 201 specifically includes:

detect a duration that the on board computing platform has not been operated since a vehicle is started; and determine, according to the duration, the dormancy level corresponding to the on board computing platform.

In this implementation, after starting the vehicle, the driver does not use this on board computing platform for a duration exceeding a preset duration, which indicates that a probability of the driver subsequently calling this on board computing platform is low. Therefore, control operations of the operating states of the processors in the on board computing platform may be implemented according to the duration that the on board computing platform has not been operated.

Therefore, after the duration that the on board computing platform has not been operated after the vehicle is started is determined, a current dormancy level of the vehicle corresponding to the duration may be determined according to the duration. In different dormancy levels, at least one processor in the on board computing platform may be controlled to perform dormancy and wakening operations according to different strategies.

Taking a practical application as an example, the operating states of the performance processor and the security processor may be adjusted in turn according to a length of the duration that the on board computing platform has not been operated. For example, when the duration is short, the performance processor may be controlled to enter a dormancy state, and data collecting and computing are no longer performed. When the duration is long, it may be judged that the driver is less likely to call this on board computing platform, at this time, the CAN bus/Ethernet may be controlled to no longer send the control instruction to other on board controllers, thereby further achieving the effect of saving the power consumption.

The dormancy controlling method for the on board computing platform provided by this embodiment determines the duration that the on board computing platform has not been operated after the on board computing platform is powered on, and determines the dormancy level corresponding to the duration according to the duration, so that the operating states of different processors in the on board computing platform can be controlled according to the dormancy level. Furthermore, different levels of dormancy controlling of the on board computing platform can be realized in different application scenarios, and the effect of saving the power consumption can be achieved on the basis of ensuring that the on board computing platform can realize the functions corresponding to the application scenarios.

Further, on the basis of the first embodiment, a time threshold is included, where the time threshold includes a first time threshold, a second time threshold, and a third time threshold that are sequentially increased in duration, where the larger the time threshold is, the higher a ratio of dormancy devices in the on board computing platform in the corresponding dormancy level is; and the dormancy level includes a first-level dormancy, a second-level dormancy and a third-level dormancy in which the ratio of the dormancy devices in the on board computing platform increases sequentially.

In this embodiment, different dormancy levels correspond to different time thresholds. The current dormancy level of the vehicle can be determined by comparing the duration with the time threshold.

Specifically, a time threshold that the duration satisfies may be determined, and a corresponding dormancy level is determined according to the time threshold. The larger the time threshold is, the higher the ratio of the dormancy devices in the on board computing platform in the corresponding dormancy level.

By comparing the duration that the on board computing platform has not been operated with the preset time threshold, the dormancy level of the vehicle can be accurately determined according to actual application scenarios.

For example, when it is detected that the duration is greater than the preset first time threshold, it may be determined that the current dormancy level is the first-level dormancy. Under the first-level dormancy, the processor used for computing in the on board computing platform may be controlled to perform dormancy That is, when the time interval is greater than a preset first set period, the on board computing platform may be controlled to no longer perform sensor data collecting and path computing, thereby saving the power consumption required by the on board computing platform.

Further, when it is detected in real time that the time interval is greater than the preset second time threshold, the current dormancy level may be adjusted from the first-level dormancy to the second-level dormancy. The second time threshold is greater than the first time threshold. Under the second dormancy level, the driver is less likely to call the on board computing platform, and a higher-level processor and the processor used for computing may both be controlled to enter the dormancy state.

Further, when it is detected in real time that the time interval is greater than the preset third time threshold, the current dormancy level of the vehicle may be adjusted from the second-level dormancy to the third-level dormancy. The third time threshold is greater than the second time threshold. Under the third-level dormancy, the driver may not call the on board computing platform during driving. At this time, the on board computing platform may be controlled to no longer send information to other controllers to achieve the lowest power consumption.

Taking a practical application as an example, the first time threshold may be 15 minutes, the second time threshold may be 30 minutes, and the third time threshold may be one hour. Correspondingly, if it is detected that the on board computing platform has not been operated within 15 minutes, it may be determined that the current dormancy level is the first-level dormancy, and the operating states of the processor used for computing and an external device controlled by the processor in the on board computing platform may be adjusted according to the dormancy level. When it is detected that the on board computing platform has not been operated for more than 30 minutes, the dormancy level may be adjusted from the first-level dormancy to the second-level dormancy, and the operating states of a processor used for security management and an external device controlled by the processor in the on board computing platform may be adjusted according to the second-level dormancy. When it is detected that the on board computing platform has not been operated for more than one hour, the current dormancy level may be adjusted from the second-level dormancy to the third-level dormancy, and then the on board computing platform may be controlled to no longer send data to other controllers according to the third-level dormancy.

The dormancy controlling method for the on board computing platform provided by this embodiment can realize a level-by-level dormancy of the on board computing platform by determining the dormancy level according to the time interval, thereby satisfying demands for power consumption under different scenarios, where each level corresponds to a different power consumption.

Further, on the basis of the first embodiment, the method further includes:

determine that a current dormancy level is the third-level dormancy if it is detected that the vehicle is powered off, or a key of the vehicle is detected to be removed.

In this embodiment, when it is detected that the vehicle is powered off or the key of the vehicle is removed, it indicates that the driver temporarily has no need to drive, and accordingly, the on board computing platform will not be called for autonomous driving. Therefore, in order to control the on board computing platform to reach the lowest power consumption, it may be determined that the current dormancy level of the vehicle is the third-level dormancy.

Further, on the basis of the first embodiment, before step 201, it further includes:

acquire a dormancy instruction sent by a CAN bus, where the dormancy instruction includes the dormancy level, the dormancy instruction is input by a user through a display interface preset on a vehicle or a display interface of a terminal device, or the dormancy instruction is triggered by the user by triggering a preset component in the vehicle.

In this embodiment, the user may also manually select a dormancy level to be adjusted according to actual needs except for determining the dormancy level according to the time interval.

Taking a practical application as an example, a display interface may be provided in the vehicle, and the user can input the dormancy instruction on the display interface by means of interacting with the interface, where the dormancy instruction may include the dormancy level. Correspondingly, the dormancy controlling apparatus for the on board computing platform may acquire the dormancy instruction sent by the CAN bus.

In an embodiment, the user may also trigger the dormancy instruction by triggering a preset component in the vehicle. For example, when it is detected that the user triggers a brake pedal, it may be determined that the current dormancy level is the third-level dormancy.

The dormancy controlling method for the on board computing platform provided by this embodiment can adjust the dormancy level according to whether the vehicle is powered off or according to the dormancy instruction sent by the CAN bus, so as to achieve more flexible implementation of dormancy controlling of different levels of the on board computing platform.

Figure 4:
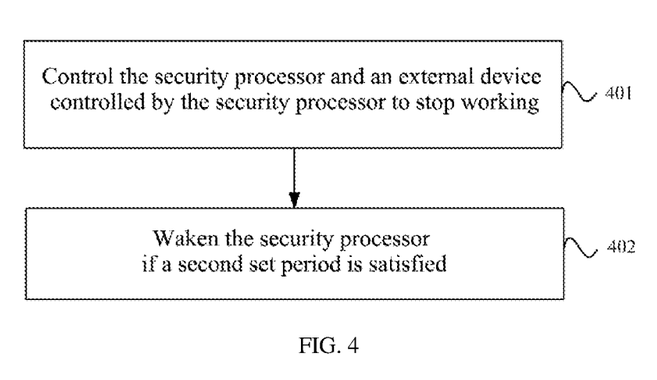
FIG. 4 is a schematic flowchart of a dormancy controlling method for an on board computing platform according to a second embodiment of the present disclosure.
Figure 5:
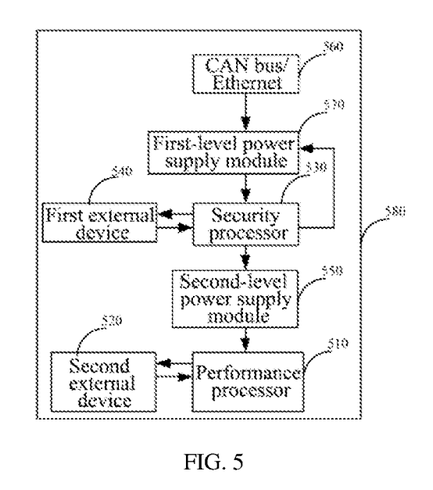
FIG. 5 is a schematic structural diagram of an on board computing platform according to an embodiment of the present disclosure.

FIG. 4 is a schematic flowchart of a dormancy controlling method for an on board computing platform according to a second embodiment of the present disclosure, and FIG. 5 is a schematic structural diagram of an on board computing platform according to an embodiment of the present disclosure. On the basis of the first embodiment, as shown in FIG. 4 and FIG. 5, the on board computing platform at least includes: a performance processor and a security processor; the performance processor is communicatively connected to the security processor, and a number of the performance processor is at least one.

Further, on the basis of the first embodiment, step 202 specifically includes:

control the performance processor and an external device controlled by the performance processor to stop working if the dormancy level is the first-level dormancy; and waken the performance processor if a first set period is satisfied to enable the performance processor to detect operating states of the external device controlled by the performance processor after the performance processor is wakened.

In this embodiment, the on board computing platform 580 is provided with a performance processor 510 and a second external device 520 controlled by the performance processor 510, where the second external device 520 includes, but is not limited to, an image collecting sensor. The performance processor 510 is specifically configured to acquire sensor data collected by the second external device 520, perform high-performance computing according to the sensor data, and output a vehicle control instruction.

In order to save the power consumption of the on board computing platform, when the dormancy level is the first-level dormancy, the performance processor and the external device controlled by the performance processor in the on board computing platform may be controlled to stop working.

Correspondingly, after the waken the performance processor if a first set period is satisfied, the method further includes:

step 401: control the security processor and an external device controlled by the security processor to stop working; and step 402: waken the security processor if a second set period is satisfied to enable the security processor to detect operating states of the performance processor and the external device controlled by the security processor after the security processor is wakened;

where the first set period and the second set period are alternately distributed with intervals on a time axis, or the first set period and the second set period are alternately distributed without intervals on the time axis.

When the dormancy level is the first-level dormancy, the performance processor used for computing and the external device controlled by the performance processor in the on board computing platform may be controlled to enter a dormancy state. At this time, the on board computing platform may no longer perform data collecting operation and data computing operation, which effectively reduces the power consumption of the on board computing platform.

Further, in order to ensure normal operation of the on board computing platform, after the performance processor performs dormancy, the performance processor may also be wakened according to the preset first set period. After being wakened, the performance processor may specifically detect the operating state of the external device controlled by the performance processor.

The on board computing platform 580 is also provided with a security processor 530 and a first external device 540 controlled by the security processor 530, where the first external device 540 includes, but is not limited to, a microcontroller unit (MCU) and a radar sensor. On one hand, the security processor 530 is configured to collect sensor data collected by the radar sensor and the MCU, and on the other hand, it is also configured to check a control instruction output by the performance processor 510. The performance processor 510 is specifically configured to perform high-performance computing according to sensor data and the sensor data collected by the radar sensor and the MCU.

In addition, the on board computing platform 580 also includes a second-level power supply module 550 that is communicatively connected to the performance processor 510 and the security processor 530, and a first-level power supply module 570 that is communicatively connected to the security processor 530 and the CAN bus/Ethernet 560, respectively. Specifically, the operating state of the performance processor 510 may be controlled by turning off the second-level power module 550. The operating state of the security processor 530 may be controlled by turning off the first-level power supply module 570.

In an embodiment, the operating states of the performance processor 510 and the security processor 530 may be controlled by directly controlling the performance processor 510 and the security processor 530 to enter the dormancy state.

Correspondingly, in order to further save the power consumption of the on board computing platform, the security processor and the external device may also be controlled to enter the dormancy state. The security processor is wakened according to the preset second set period. Therefore, after being wakened, the security processor may detect the operating states of the performance processor and the external device controlled by the performance processor.

It should be noted that in order to ensure that the performance processor and the security processor can be wakened alternately, the first set period and the second set period are alternately distributed with intervals on the time axis, or the first set period and the second set period are alternately distributed without intervals on the time axis.

Figure 6:
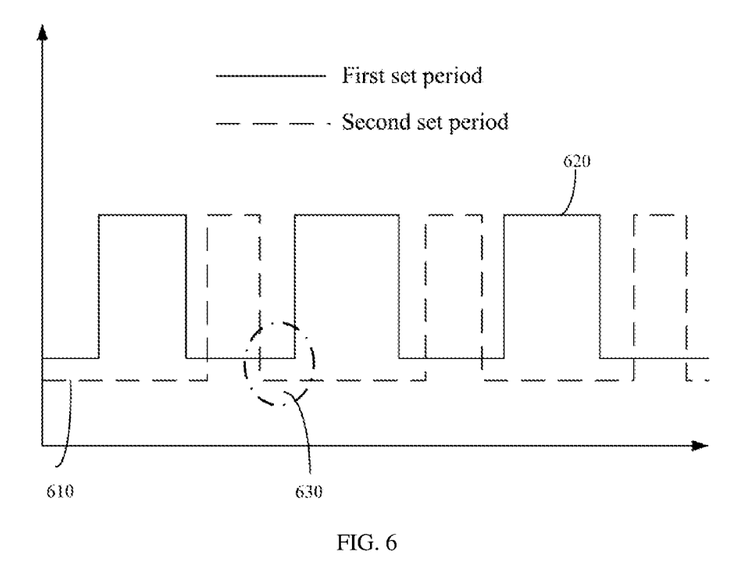
FIG. 6 is a level waveform diagram corresponding to a first-level dormancy according to an embodiment of the present disclosure.

FIG. 6 is a level waveform diagram corresponding to a first-level dormancy according to an embodiment of the present disclosure. As shown in FIG. 6, the first set period and the second set period may be alternately distributed with intervals on a time axis. When the performance processor is in a dormancy state, the performance processor is in a low level state 610 in the level waveform diagram, and is wakened according to the preset first set period, and when it is in an operating state, the performance processor is in a high level state 620 in the level waveform diagram. Correspondingly, when the performance processor is in a wakening state, the security processor is in a low level state in the level waveform diagram, and is wakened according to the preset second set period. Since the first set period and the second set period may be alternately distributed at intervals of 630 on the time axis, the performance processor and the security processor may be in the low level state at the same time within a certain period of time.

Figure 7:
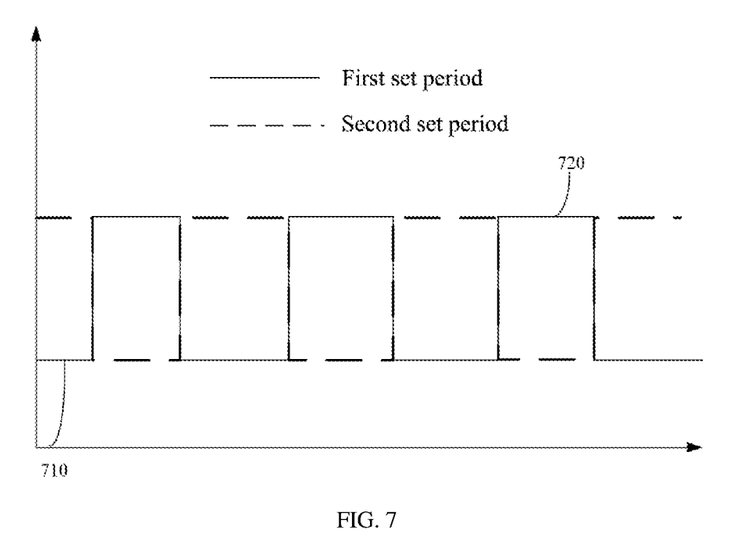
FIG. 7 is another level waveform diagram corresponding to a first-level dormancy according to an embodiment of the present disclosure.

FIG. 7 is another level waveform diagram corresponding to a first-level dormancy according to an embodiment of the present disclosure. As shown in FIG. 7, the first set period and the second set period are alternately distributed without intervals on the time axis. When the performance processor is in a dormancy state, the performance processor is in a low level state 710 in the level waveform diagram, and is wakened according to the preset first set period. When it is in an operating state, the performance processor is in a high level state 720 in the level waveform diagram. Correspondingly, when the performance processor is in a wakening state, the security processor immediately enters the low level state, and is wakened according to the preset second set period.

Specifically, on the basis of the first embodiment, the control the performance processor and an external device controlled by the performance processor to stop working includes:

control the performance processor and the external device controlled by the performance processor to enter a dormancy state; or control a power supply module corresponding to the performance processor to stop supplying power to the performance processor.

In this embodiment, specifically, the processor may be controlled to stop working by controlling the processor to enter the dormancy state, or controlling the power supply module of the processor to stop supplying power to the processor. Thus, the operating state of the processor may be controlled more flexibly.

The dormancy controlling method for the on board computing platform provided by this embodiment can effectively save the power consumption of the on board computing platform on the basis of ensuring the normal operation of the on board computing platform by controlling the first processor and the second processor to be wakened alternately at the first-level dormancy.

Further, on the basis of any of the foregoing embodiments, step 202 specifically includes:

control the performance processor, the security processor, and the external device controlled by the performance processor and the external device controlled by the security processor to enter a dormancy state if the dormancy level is the second-level dormancy.

In this embodiment, when it is detected that the current dormancy level is the second-level dormancy, in order to further save the power consumption of the on board computing platform, the performance processor and the external device controlled by the performance processor may both be directly controlled to enter the dormancy state. The security processor and the external device controlled by the security processor are controlled to enter the dormancy state.

By controlling the performance processor, the security processor, and the external devices controlled by the processors to enter the dormancy state, the power consumption required by the on board computing platform may be further reduced, making it more suitable for scenarios with low demand for the on board computing platform.

Further, on the basis of any of the foregoing embodiments, after the control the performance processor, the security processor, and the external device controlled by the performance processor and the external device controlled by the security processor to enter a dormancy state, the method further includes:

waken the security processor and detecting whether operating states of the performance processor and the external device controlled by the security processor are normal if a third set period is satisfied.

The security processor is wakened according to the preset third set period, so that the security processor can detect, after being wakened, the operating states of the external device controlled by the security processor as well as the performance processor.

It should be noted that the level of the second-level dormancy is higher than the first-level dormancy. When it is in the second-level dormancy, the driver is less likely to call the on board computing platform. At this time, the dormancy time of the security processor may be controlled for longer. Therefore, the third set period is greater than the first set period and the second set period.

In an implementation, the performance processor may periodically send preset heartbeat information to the security processor, and the security processor may determine the operating state of the performance processor according to the heartbeat information. If it is detected that the performance processor has not sent the heartbeat information for a duration exceeding this period, it indicates that the performance processor is not operating normally. At this time, a fault reminder may be sent to the driver.

The dormancy controlling method for the on board computing platform provided by this embodiment controls the performance processor and the external device to enter the dormancy state at the second-level dormancy, and controls the security processor to perform dormancy and be wakened according to the preset second set period, thereby enabling the on board computing platform to further achieve the effect of saving power consumption.

Further, on the basis of any of the foregoing embodiments, the on board computing platform further includes a CAN bus/Ethernet, and the CAN bus/Ethernet is communicatively connected to the security processor; step 202 specifically includes:

control the performance processor and the security processor, the external device controlled by the performance processor and the external device controlled by the security processor, and a circuit except for a transceiver in the CAN bus/Ethernet, to enter a dormancy state if the dormancy level is the third-level dormancy.

In this embodiment, the on board computing platform further includes the CAN bus/Ethernet, and the CAN bus/Ethernet is communicatively connected to the security processor, and is configured to acquire an control instruction checked by the security processor, the control instruction is sent to an on board controller in the vehicle to control the vehicle to autonomously driving.

Based on the above structure, when it is detected that the current dormancy level is the third-level dormancy, in order to further save the power consumption of the on board computing platform, the on board computing platform may be controlled to no longer send data to other controllers in the vehicle. Therefore, the performance processor, the security processor, and the external devices controlled by the processors may be controlled to enter the dormancy state. That is, the performance processor and the security processor are controlled to no longer perform data collecting and computing operations. And the circuit except for the transceiver in the preset CAN bus/Ethernet of the on board computing platform are controlled to enter the dormancy state.

Further, on the basis of any one of the foregoing embodiments, after step 402, the method further includes:

acquire a wakening instruction sent by a terminal device; and control the circuit except for the transceiver in the CAN bus/Ethernet to enter a wakening state according to the wakening instruction.

In this embodiment, in the third-level dormancy, a transceiver circuit in the on board computing platform is still operating normally, and it can acquire the wakening instruction sent by the terminal device. According to the wakening instruction, the circuit except for the transceiver in the CAN bus/Ethernet is controlled to enter the wakening state.

In an embodiment, according to the wakening instruction, the circuit except for the transceiver in the CAN bus/Ethernet, the performance processor, and the security processor may be controlled to enter the wakening state to control the vehicle to autonomously driving.

Wakening the circuit except for the transceiver in the CAN bus/Ethernet according to the wakening instruction of the user can ensure the availability of the on board computing platform when the user needs to use the on board computing platform on the basis of saving energy.

The dormancy controlling method for the on board computing platform provided by this embodiment controls the performance processor, the external device controlled by the performance processor, the security processor and the external device controlled by the security processor all to enter the dormancy state, and control the circuit except for the transceiver in the preset CAN bus/Ethernet of the on board computing platform to enter the dormancy state. Thereby, the power consumption of the on board computing platform can be minimized, and the endurance of the vehicle can be improved.

Figure 8:
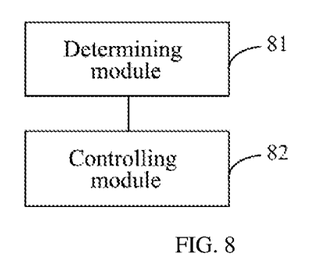
FIG. 8 is a schematic structural diagram of a dormancy controlling apparatus for an on board computing platform according to a third embodiment of the present disclosure.

FIG. 8 is a schematic structural diagram of a dormancy controlling apparatus for an on board computing platform according to a third embodiment of the present disclosure. As shown in FIG. 8, the dormancy controlling apparatus for the on board computing platform specifically includes: a determining module 81 and a controlling module 82. The determining module 81 is configured to determine a dormancy level corresponding to the on board computing platform. The controlling module 82 is configured to control, according to the dormancy level, operating states of at least one processor and an external device controlled by the at least one processor in the on board computing platform.

Further, on the basis of the third embodiment, the determining module is configured to: detect a duration that the on board computing platform has not been operated since a vehicle is started; and determine, according to the duration, the dormancy level corresponding to the on board computing platform.

Further, on the basis of the third embodiment, the determining module is configured to: acquire a dormancy instruction sent by a CAN bus, where the dormancy instruction includes the dormancy level, the dormancy instruction is input by a user through a display interface preset on a vehicle or a display interface of a terminal device, or the dormancy instruction is triggered by the user by triggering a preset component in the vehicle.

Further, on the basis of the third embodiment, a time threshold is included, where a time threshold includes a first time threshold, a second time threshold, and a third time threshold that are sequentially increased in duration, where the larger the time threshold is, the higher a ratio of dormancy devices in the on board computing platform in the corresponding dormancy level is; and the dormancy level includes a first-level dormancy, a second-level dormancy and a third-level dormancy in which the ratio of the dormancy devices in the on board computing platform increases sequentially.

Further, on the basis of the third embodiment, the determining module is configured to: determine that a current dormancy level is the third-level dormancy if it is detected that a vehicle is powered off, or a key of the vehicle is detected to be removed.

Further, on the basis of the third embodiment, the on board computing platform at least includes: a performance processor and a security processor; the performance processor is configured to collect vehicle sensor data to generate an autonomous driving control instruction; the performance processor is communicatively connected to the security processor, and the number of the performance processor is at least one; and the controlling module is configured to: control the performance processor and an external device controlled by the performance processor to stop working if the dormancy level is the first-level dormancy; and waken the performance processor if a first set period is satisfied to enable the performance processor to detect operating states of the external device controlled by the performance processor after the performance processor is wakened.

Further, on the basis of any one of the foregoing embodiments, the controlling module is configured to: control the security processor and an external device controlled by the security processor to stop working; and waken the security processor if a second set period is satisfied to enable the security processor to detect operating states of the performance processor and the external device controlled by the security processor after the security processor is wakened; where the first set period and the second set period are alternately distributed with intervals on a time axis, or the first set period and the second set period are alternately distributed without intervals on the time axis.

Further, on the basis of any one of the foregoing embodiments, the controlling module is configured to: control the performance processor and the external device controlled by the performance processor to enter a dormancy state; or control a power supply module corresponding to the performance processor to stop supplying power to the performance processor.

Further, on the basis of any one of the foregoing embodiments, the controlling module is configured to: control the performance processor, the security processor, and the external device controlled by the performance processor and the external device controlled by the security processor to enter a dormancy state if the dormancy level is the second-level dormancy.

Further, on the basis of any one of the foregoing embodiments, the controlling module is configured to: waken the security processor and detect whether operating states of the performance processor and the external device controlled by the security processor are normal if a third set period is satisfied.

Further, on the basis of any one of the foregoing embodiments, the on board computing platform further includes a CAN bus/Ethernet, and the CAN bus/Ethernet is communicatively connected to the security processor; the controlling module is configured to: control the performance processor and the security processor, the external device controlled by the performance processor and the external device controlled by the security processor, and a circuit except for a transceiver in the CAN bus/Ethernet, to enter a dormancy state if the dormancy level is the third-level dormancy.

Further, on the basis of any one of the foregoing embodiments, the apparatus further includes: an acquiring module, configured to acquire a wakening instruction sent by a terminal device; and the controlling module is configured to control the circuits except for the transceivers in the CAN bus/Ethernet to enter a wakening state according to the wakening instruction.

According to an embodiment of the present disclosure, the present disclosure also provides an electronic device and a readable storage medium.

Figure 9:
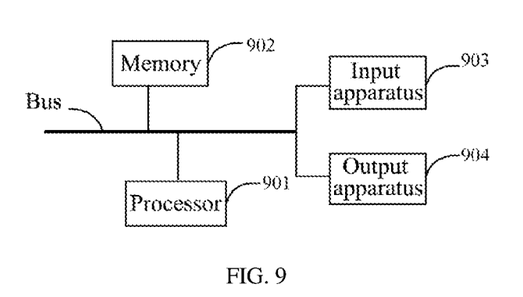
FIG. 9 is a schematic structural diagram of an electronic device according to a fourth embodiment of the present disclosure.

FIG. 9 is a schematic structural diagram of an electronic device according to a fourth embodiment of the present disclosure. As shown in FIG. 9, it is a block diagram of an electronic device according to a dormancy controlling method for an on board computing platform of an embodiment of the present disclosure. The electronic device is intended to represent various forms of digital computers, such as laptop computer, desktop computer, workstation, personal digital assistant, server, blade server, mainframe computer, and other suitable computers. The electronic device may also represent various forms of mobile apparatuses, such as personal digital assistant, cellular phone, smart phone, wearable device and other similar computing apparatuses. The components shown herein, their connections and relationships, and their functions are merely examples, and are not intended to limit the implementations of the present disclosure described and/or claimed herein.

As shown in FIG. 9, the electronic device includes: one or more processors 901, a memory 902, and interfaces for connecting various components, including high-speed interfaces and low-speed interfaces. The various components are interconnected using different buses, and can be mounted on a common motherboard or otherwise installed as required. The processor may process instructions executed within the electronic device, including instructions stored in or on the memory to display graphical information of Graphical User Interface (GUI) on an external input/output apparatus, such as a display device coupled to an interface. In other implementations, a plurality of processors and/or a plurality of buses may be used together with a plurality of memories, if desired. Similarly, a plurality of electronic devices can be connected, and each device provides part of necessary operations (for example, as a server array, a group of blade servers, or a multi-processor system). One processor 21 is taken as an example in FIG. 9.

The memory 902 is a non-transitory computer-readable storage medium provided by the present disclosure. The memory stores instructions executable by at least one processor, so that the at least one processor executes the dormancy controlling method for the on board computing platform provided by the present disclosure. The non-transitory computer-readable storage medium of the present disclosure stores computer instructions, the computer instructions are used to cause a computer to execute the dormancy controlling method for the on board computing platform provided by the present disclosure.

As a non-transitory computer-readable storage medium, the memory 902 may be configured to store non-transitory software programs, non-transitory computer-executable programs and modules, such as program instructions/modules corresponding to the dormancy controlling method for the on board computing platform in the embodiments of the present disclosure (for example, the determining module 81 and the controlling module 83 shown in FIG. 4). The processor 901 executes various functional applications and data processing of the server by running non-transitory software programs, instructions and modules stored in the memory 902 that is, the dormancy controlling method for the on board computing platform in the above-mentioned method embodiments are realized.

The memory 902 may include a storage program area and a storage data area, where the storage program area may store an operating system and at least one application program required for functions; the storage data area may store data created according to the use of the electronic device for controlling dormancy of the on board computing platform, and the like. In addition, the memory 902 may include high-speed random access memory, and may also include non-transitory memory, such as at least one magnetic disk memory device, flash memory device, or other non-transitory solid-state memory devices. In some embodiments, the memory 902 may include memories remotely disposed with respect to the processor 901, and these remote memories may be connected to the electronic device for controlling dormancy of the on board computing platform through a network. Examples of the above-mentioned network include, but are not limited to, an Internet, an Intranet, a local area network, a mobile communication network and combination thereof.

The electronic device for implementing the dormancy controlling method for the on board computing platform may further include: an input apparatus 903 and an output apparatus 904. The processor 901, the memory 902, the input apparatus 903, and the output apparatus 904 may be connected through a bus or other means. In FIG. 9, a connection through a bus is taken as an example.

The input apparatus 903 may receive input numeric or character information, and generate key signal inputs related to user settings and function control of electronic device for controlling dormancy of the on board computing platform, for example input apparatus such as touch screen, keypad, mouse, track pad, touch pad, pointing stick, one or more mouse buttons, trackball, joystick. The output apparatus 904 may include a display device, an auxiliary lighting apparatus (e.g., an LED), a haptic feedback apparatus (e.g., a vibration motor), and the like. The display device may include, but is not limited to, a liquid crystal display (LCD), a light-emitting diode (LED) display, and a plasma display. In some implementations, the display device may be a touch screen.

Various implementations of the systems and technologies described herein may be implemented in a digital electronic circuit system, an integrated circuit system, an application-specific ASIC (application-specific integrated circuit), computer hardware, firmware, software, and/or combination thereof. These various implementations may include: being implemented in one or more computer programs, the one or more computer programs are executable and/or interpreted on a programmable system including at least one programmable processor, the programmable processor may be a dedicated or general-purpose programmable processor that may receive data and instructions from a storage system, at least one input device, and at least one output device, and transmit data and instructions to the storage system, at least one input apparatus, and at least one output apparatus.

These computer programs (also known as programs, software, software applications, or codes) include machine instructions of a programmable processor, and can be implemented by using high-level procedures and/or object-oriented programming languages, and/or assembly/machine languages. As used herein, the terms "machine-readable medium" and "computer-readable medium" refer to any computer program product, device, and/or apparatus used to provide machine instructions and/or data to a programmable processor (e.g., a magnetic disk, an optical disk, a memory, a programmable logic device (PLD)), including machine-readable medium that receive machine instructions as machine-readable signals. The term "machine-readable signal" refers to any signal used to provide machine instructions and/or data to a programmable processor.

To provide interaction with the user, the systems and technologies described herein can be implemented on a computer having: a display apparatus (e.g., a CRT (cathode ray tube) or LCD (liquid crystal display) monitor) for displaying information to the user; and a keyboard and pointing apparatus (e.g., a mouse or a trackball) through which the user can provide input to the computer. Other kinds of apparatuses may also be used to provide interaction with the user; for example, the feedback provided to the user may be any form of sensor feedback (for example, visual feedback, audible feedback, or haptic feedback); and input from the user may be received in any form, including acoustic input, voice input or haptic input.

The systems and technologies described herein can be implemented in a computing system including background components (e.g., as a data server), or a computing system including middleware components (e.g., an application server), or a computing system including front-end components (e.g., a user computer with a graphical user interface or a web browser through which users can interact with implementation of the systems and technologies described herein), or a computing system that includes any combination of such back-end components, middleware components, or front-end components. The components of the systems can be interconnected by any form or medium of digital data communication (e.g., a communication network). Examples of the communication network include local area network (LAN), wide area network (WAN), and Internet.

The computer system may include a client side and a server. The client side and the server are generally remote from each other and typically interact through a communication network. The relationship between the client side and server is generated by computer programs running on a corresponding computer and having a client side-server relationship with each other.

It should be understood that various forms of processes shown above can be used to reorder, add, or delete steps. For example, various steps recorded in the present disclosure can be executed in parallel, sequentially or in different orders. As long as the desired results of the technical solutions disclosed in the present disclosure can be achieved, there is no limitation herein.

The above-mentioned specific implementations do not constitute a limitation of the protection scope of the present disclosure. It should be understood by those skilled in the art that various modifications, combinations, sub-combinations and substitutions may be made according to design requirements and other factors. Any modification, equivalent replacement, improvement and the like made within the spirit and principle of the present disclosure shall be included in the protection scope of the present disclosure.

What is claimed is:

1. A dormancy controlling method for an on board computing platform, comprising:
determining a dormancy level corresponding to the on board computing platform; and
controlling, according to the dormancy level, operating states of at least one processor and an external device controlled by the at least one processor in the on board computing platform;
wherein the determining a dormancy level corresponding to the on board computing platform comprises:
detecting a duration that the on board computing platform has not been operated since a vehicle is started; and
determining the dormancy level corresponding to the on board computing platform by comparing the duration with preset time thresholds, and different dormancy levels correspond to different preset time thresholds;
wherein the preset time thresholds comprise a first time threshold, a second time threshold, and a third time threshold that are sequentially increased in duration, wherein the larger a time threshold is, the higher a dormancy ratio of the at least one processor in the on board computing platform in the corresponding dormancy level is; and
the dormancy level comprises a first-level dormancy, a second-level dormancy and a third-level dormancy in which the dormancy ratio of the at least one processor in the on board computing platform increases sequentially.

2. The method according to claim 1, wherein the determining a dormancy level corresponding to the on board computing platform comprises:
determining that a current dormancy level is the third-level dormancy if it is detected that a vehicle is powered off, or a key of the vehicle is detected to be removed.

3. A non-transitory computer-readable storage medium storing computer instructions, wherein the computer instructions are used to cause a computer to execute the method according to claim 1.

4. The method according to claim 1, wherein the on board computing platform at least comprises: a performance processor and a security processor; the performance processor is communicatively connected to the security processor, and a number of the performance processor is at least one;
the controlling, according to the dormancy level, operating states of at least one processor and an external device controlled by the at least one processor in the on board computing platform comprises:
controlling the performance processor and an external device controlled by the performance processor to stop working if the dormancy level is the first-level dormancy; and
wakening the performance processor if a first set period is satisfied to enable the performance processor to detect operating states of the external device controlled by the performance processor after the performance processor is wakened.

5. The method according to claim 4, wherein the controlling the performance processor and an external device controlled by the performance processor to stop working comprises:
controlling the performance processor and the external device controlled by the performance processor to enter a dormancy state; or controlling a power supply module corresponding to the performance processor to stop supplying power to the performance processor.

6. The method according to claim 4, wherein after the wakening the performance processor if a first set period is satisfied, the method further comprises:
controlling the security processor and an external device controlled by the security processor to stop working; and
wakening the security processor if a second set period is satisfied to enable the security processor to detect operating states of the performance processor and the external device controlled by the security processor after the security processor is wakened;
wherein the first set period and the second set period are alternately distributed with intervals on a time axis, or the set time period and the second set period are alternately distributed without intervals on the time axis.

7. The method according to claim 6, wherein the controlling, according to the dormancy level, operating states of at least one processor and an external device controlled by the at least one processor in the on board computing platform comprises:
controlling the performance processor, the security processor, and the external device controlled by the performance processor and the external device controlled by the security processor to enter a dormancy state if the dormancy level is the second-level dormancy.

8. The method according to claim 7, wherein after the controlling the performance processor, the security processor, and the external device controlled by the performance processor and the external device controlled by the security processor to enter a dormancy state, the method further comprises:
wakening the security processor and detecting whether operating states of the performance processor and the external device controlled by the security processor are normal if a third set period is satisfied.

9. The method according to claim 6, wherein the on board computing platform further comprises a CAN bus/Ethernet, and the CAN bus/Ethernet is communicatively connected to the security processor;
the controlling, according to the dormancy level, operating states of at least one processor and an external device controlled by the at least one processor in the on board computing platform comprises:
controlling the performance processor and the security processor, the external device controlled by the performance processor and the external device controlled by the security processor, and a circuit except for a transceiver in the CAN bus/Ethernet, to enter a dormancy state if the dormancy level is the third-level dormancy.

10. The method according to claim 9, wherein after the controlling, according to the dormancy level, operating states of at least one processor and an external device controlled by the at least one processor in the on board computing platform, the method further comprises:
acquiring a wakening instruction sent by a terminal device; and controlling the circuit except for the transceiver in the CAN bus/Ethernet to enter a wakening state according to the wakening instruction.

11. A dormancy controlling apparatus for an on board computing platform, comprising:
a processor; and
a memory communicatively connected to the processor; wherein, the memory stores instructions executable by the processor, and the instructions are executed by the processor to enable the processor to:
determine a dormancy level corresponding to the on board computing platform; and
control, according to the dormancy level, operating states of at least one processor and an external device controlled by the at least one processor in the on board computing platform;
wherein the processor is further enabled to:
detect a duration that the on board computing platform has not been operated since a vehicle is started; and
determine the dormancy level corresponding to the on board computing platform by comparing the duration with preset time thresholds, and different dormancy levels correspond to different preset time thresholds;
wherein the preset time thresholds comprise a first time threshold, a second time threshold, and a third time threshold that are sequentially increased in duration, wherein the larger a time threshold is, the higher a dormancy ratio of the at least one processor in the on board computing platform in the corresponding dormancy level is; and
the dormancy level comprises a first-level dormancy, a second-level dormancy and a third-level dormancy in which the dormancy ratio of the at least one processor in the on board computing platform increases sequentially.

12. The apparatus according to claim 11, wherein the processor is further enabled to:
determine that a current dormancy level is the third-level dormancy if it is detected that a vehicle is powered off, or a key of the vehicle is detected to be removed.

13. The apparatus according to claim 11, wherein the on board computing platform at least comprises: a performance processor and a security processor; the performance processor is communicatively connected to the security processor, and a number of the performance processor is at least one;
the processor is further enabled to:
control the performance processor and an external device controlled by the performance processor to stop working if the dormancy level is the first-level dormancy; and
waken the performance processor if a first set period is satisfied to enable the performance processor to detect operating states of the external device controlled by the performance processor after the performance processor is wakened.

14. The apparatus according to claim 13, wherein the processor is further enabled to:
control the security processor and an external device controlled by the security processor to stop working; and
waken the security processor if a second set period is satisfied to enable the security processor to detect operating states of the performance processor and the external device controlled by the security processor after the security processor is wakened;
wherein the first set period and the second set period are alternately distributed with intervals on a time axis, or the first set period and the second set period are alternately distributed without intervals on the time axis.

* * * * *